United States Patent [19]

Amano et al.

[11] Patent Number: 5,586,001

[45] Date of Patent: Dec. 17, 1996

[54] SOLID ELECTROLYTE CAPACITOR USING POLYANILINE DOPED WITH DISULFONIC ACID

[75] Inventors: Kosuke Amano; Hitoshi Ishikawa; Etsuo Hasegawa, all of Tokyo, Japan

[73] Assignee: NEC Corporation, Tokyo, Japan

[21] Appl. No.: 515,804

[22] Filed: Aug. 16, 1995

[30] Foreign Application Priority Data

Aug. 16, 1994 [JP] Japan .................... 6-192353

[51] Int. Cl.$^6$ ................ H01G 9/00; H01G 9/02
[52] U.S. Cl. ................ 361/525; 252/62.2
[58] Field of Search ................ 361/525, 523, 361/524, 528, 305; 252/62.2

[56] References Cited

U.S. PATENT DOCUMENTS

| | | | |
|---|---|---|---|
| 4,780,796 | 10/1988 | Fukuda et al. | 361/525 |
| 4,910,645 | 3/1990 | Jonas et al. | 361/525 |
| 5,223,002 | 6/1993 | Ross | 361/525 |
| 5,428,500 | 7/1995 | Nishiyama et al. | 361/525 |
| 5,436,796 | 7/1995 | Abe et al. | 361/525 |
| 5,455,736 | 10/1995 | Nishiyama et al. | 361/525 |
| 5,461,537 | 10/1995 | Kobayashi et al. | 361/525 |

FOREIGN PATENT DOCUMENTS

| | | |
|---|---|---|
| 62-29124 | 2/1987 | Japan . |
| 64-24410 | 1/1989 | Japan . |
| 541338 | 2/1993 | Japan . |
| 583167 | 11/1993 | Japan . |

OTHER PUBLICATIONS

Database WPI, Section Ch, Week 9436.
Patent Abstracts of Japan, vol. 17, No. 334 (E–1387), Jun. 24, 1993.
M. Abe et al, "Soluble and HIgh Molecular Weight Polyaniline", *J. Chem. Soc., Chemical Communications*, 1989, pp. 2–4.
F. Marshall Beringer et al, "Diaryliodonium Salts. XI. Salts Derived from Phenoxyacetic and β–Phenoxyethanesulfonic Acids", *J. Am. Chem. Soc.*, vol. 81 (1959), pp. 2297–3000.
Cortese, *Organic Syntheses II* (1943), pp. 563–565.

*Primary Examiner*—Leo P. Picard
*Assistant Examiner*—Phuong T. Vu
*Attorney, Agent, or Firm*—Sughrue, Mion, Zinn, Macpeak & Seas

[57] ABSTRACT

In a solid electrolyte capacitor in which the solid electrolyte is polyaniline or a polymer of an aniline derivative doped with a prototnic acid, a disulfonic acid represented by the general formula (1) is used as the protonic acid to enhance high-temperature endurance and humidity resistance of the solid electrolyte:

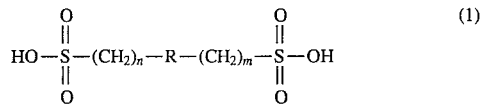

where R is m-phenylene, p-phenylene or a $C_7$ to $C_{10}$ bridged cycloalkylene group, and n and m are independently integers from 1 to 3. Disulfonic acids of the general formula (1) are novel compounds.

16 Claims, 1 Drawing Sheet

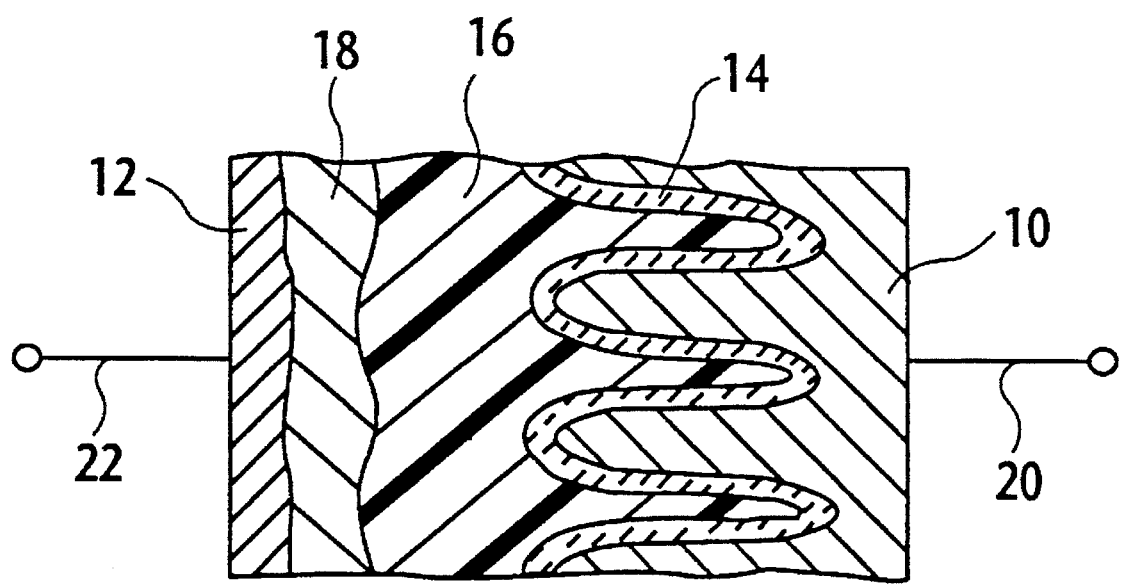

SOLID ELECTROLYTE CAPACITOR USING POLYANILINE DOPED WITH DISULFONIC ACID

BACKGROUND OF THE INVENTION

This invention relates to a solid electrolyte capacitor in which the solid electrolyte is an electroconductive polyaniline doped with a disulfonic acid, and more particularly to the use of a group of novel disulfonic acids each as the dopant in the polyaniline solid electrolyte.

It is well known that polyaniline provides an electroconductive polymer by doping with a protonic acid which can be selected from various organic and inorganic acids. Herein, the term "polyaniline" means a polymer of aniline or an aniline derivative (substituted aniline). Polyaniline can be made relatively high in conductivity, and an important advantage of polyaniline over other electroconductive polymers represented by polypyrrole is very good stability in the air.

Recently it has been developed to use electroconductive polyanilines in solid electrolyte capacitors as the solid electrolyte. In fact, by using a polyaniline solid electrolyte it is possible to produce a small-sized capacitor that is relatively large in capacitance and fairly good in heat resistance and exhibits good capacitor characteristics in a high-frequency region.

Various kinds of protonic acids have been used in polyanilines in solid electrolyte capacitors, and recently there is a trend toward the use of organic sulfonic acids. For example, JP 62-29124 A and JP 64-24410 A show using arylsulfonic acids such as benzenesulfonic acid, toluenesulfonic acid and naphthalenedisulfonic acid, and JP 5-83167 shows making a selection from arylsulfonic acids, arylenedisulfonic acids, alkylsulfonic acids and alkyelenedisulfonic acids.

The important characteristics of a polyaniline solid electrolyte such as conductivity, heat resistance and humidity resistance depend greatly on the chemical structure of the sulfonic acid used as the dopant. As to heat resistance of the solid electrolyte in a practical capacitor, a matter of serious concern is the endurance to soldering temperatures at the time of packaging the capacitor or mounting the capacitor to a printed circuit board. The soldering temperatures range from about 230° C. to about 260° C. In general, polyaniline solid electrolytes doped with either an alkylmonosulfonic acid or an arylmonosulfonic acid are insufficient in humidity resistance and high-temperature endurance. The high-temperature endurance can be improved by using a disulfonic acid, and in this regard arylenedisulfonic acids are better than alkylenedisulfonic acids. There is a possibility of further improving both humidity resistance and high-temperature endurance by using a polysulfonic acid. However, still there is a demand for a superior dopant for polyaniline in order to obtain a polyaniline solid electrolyte which is fully satisfactory in respect of conductivity, capability of realizing large capacitance, high-temperature endurance and humidity resistance.

In the fabrication of a solid electrolyte capacitor using polyaniline, it is usual to form the solid electrolyte layer of polyaniline by polymerizing aniline over a dielectric oxide film on the anode by using an oxidant in the presence of a sulfonic acid.

Polyanilines are generally poorly soluble in conventional organic solvents. However, it is possible to obtain a soluble polyaniline by a special method as reported by Abe et al., J. of Chem. Soc., Chemical Communications (1989), pp. 1736–1738. JP 5-41338 A relates to the fabrication of a solid electrolyte capacitor and shows forming a polyaniline solid electrolyte layer by first forming an undoped polyaniline layer by applying a solution of a soluble polyaniline onto the dielectric oxide film on the anode and removing the solvent and thereafter doping the polyaniline layer with a disulfonic acid or a polysulfonic acid. The post-doped polyaniline is very good in humidity resistance. This method may be practicable when the anode body is a metal foil (usually aluminum foil) which is etched for enlargement of surface area, but this method is impracticable when a sintered pellet (usually of tantalum) is used as the anode because high viscosity of the polyaniline solution hinders the solution from intruding into the micropores in the sintered pellet.

SUMMARY OF THE INVENTION

It is an object of the present invention to provide a solid electrolyte capacitor using an improved polyaniline solid electrolyte which is high in conductivity and excellent in high-temperature endurance and humidity resistance.

Also it is an object of the invention to provide novel disulfuonic acids which are useful particularly as dopants for polyanilines.

A solid electrolyte capacitor according to the invention has an anode, a dielectric oxide film formed on the surface of the anode, a solid electrolyte layer which overlies dielectric oxide film and a cathode in contact with the solid electrolyte layer, and the solid electrolyte layer is formed of an electroconductive polymer comprising a polymer of aniline or at least one aniline derivative and, as a dopant, a protonic acid. The capacitor according to the invention is characterized in that the protonic acid in the electroconductive polymer is a disulfonic acid represented by the general formula (1):

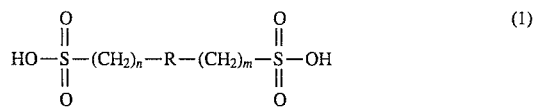

(1)

where R is m-phenylene, p-phenylene or a $C_7$ to $C_{10}$ bridged cycloalkylene group, and n and m are independently integers ranging from 1 to 3.

The disulfonic acids of the general formula (1) are novel compounds, and they are very suitable for use as dopants for electroconductive polyanilines. These disulfonic acids are very good in high-temperature endurance because of having a hard skeleton (an arylene group or a bridged cycloalkylene group) in the molecule. Furthermore, since these disulfonic acids have two sulfonic acid groups in the molecule, polyanilines doped with these disulfonic acids exhibit high resistance to humidity at elevated temperatures.

In this invention o-phenylene group is not employed as R in the general formula (1). If R is o-phenylene group, electroconductive polyanilines using the disulfonic acid are inferior in both heat resistance and humidity resistance. Examples of bridged cycloalkylene groups useful as R in the general formula (1) are bicyclo[2.2.1]heptane-2,6-diyl group (7 carbon atoms), bicyclo[2.2.2]octane-2,3-diyl group (8 carbon atoms), tricyclo[5.2.1.0$^{2,6}$]decane-4,8-diyl group (10 carbon atoms) and camphor-9,10-diyl group (10 carbon atoms).

In the general formula (1) both n and m are not larger than 3, and with a view to increasing the solubility of the disulfonic acids in water it is desirable to make both n and m as small as possible. However, if either of n and m is 0 the synthesis of the disulfonic acids suffers from intolerably low yield or results in a complete failure.

In a polyaniline solid electrolyte according to the invention, if desired, two or more kinds of disulfonic acids of the general formula (1) may be used jointly. In polyaniline solid electrolytes according to the invention the polyaniline is not limited to a polymer of unsubstituted aniline. Also it is possible to use a polymer of an aniline derivative (substituted aniline) or a copolymer of aniline derivatives. The substituents in aniline derivatives can be chosen from alkyl groups, alkoxyl groups, phenyl group, ester groups and thioether groups, and aniline derivatives having 1 to 4 substituents in the benzene ring can be used. Also it is possible to use aniline derivatives having a substituent at the N-position. Preferred aniline derivatives are alkylanilines and alkoxyanilines.

In an electroconductive polyaniline according to the invention the proportion of the disulfonic acid to the aniline or aniline derivative units of the polyaniline is usually not less than 15% by mol, and a preferred range is from 15 to 40% by mol.

Electroconductive polyanilines according to the invention are high in conductivity and excellent in high temperature endurance and humidity resistance. These electroconductive polyanilines are very suitable for use as solid electrolytes in solid electrolyte capacitors and provide solid electrolyte capacitors which are very good in endurance to high-temperature and high-humidity conditions and satisfactory in endurance to the soldering temperatures.

BRIEF DESCRIPTION OF THE DRAWING

The single FIGURE schematically shows a fragmentary longitudinal section of a solid electrolyte capacitor in which the invention is embodied.

DESCRIPTION OF THE PREFERRED EMBODIMENTS

Disulfonic acids of the general formula (1) can be prepared by using the reactions described in Beringer et al., J. Am. Chem. Soc., Vol. 81 (1959), pp. 2997–3000 and Cortese, Organic Syntheses II (1943), pp. 563–565.

That is, a dihalogen compound represented by the general formula (2) is reacted with a sulfite represented by the general formula (3):

$$X-(CH_2)_n-R-(CH_2)_m-X \qquad (2)$$

where X is Cl, Br or I, and R, m and n are as defined with respect to the general formula (1);

$$Y_2SO_3 \qquad (3)$$

where Y is a monovalent cation.

As the sulfite (3), usually it is suitable to use sodium sulfite or potassium sulfite. In water or a mixture of waiter and an organic solvent, the dihalogen compound (2) is mixed with the sulfite (3), and the mixture is kept heated under reflux for 5 to 50 h (in most cases 5 to 30 h). The organic solvent is used when the dihalogen compound is insoluble in water or has a melting point lower than the boiling point of the aqueous solution in order to uniformize the reaction system and enhance the efficiency of the reaction. It is natural to use an organic solvent that can dissolve the dihalogen compound and is inactive to the reactants and reaction products. The molar ratio of the sulfite to the dihalogen compound is from 2:1 to about 6:1. The reaction gives a salt of the aimed disulfonic acid (1) as represented by the following equation. The obtained disulfonate is washed with a suitable organic solvent such as diethyl ether. According to the need the disulfonate may be purified by recrystallization. Then the disulfonate is converted into the aimed disulfonic acid by a usual technique such as ion exchange or dialysis.

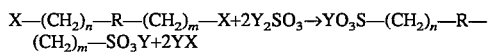

$$X-(CH_2)_n-R-(CH_2)_m-X+2Y_2SO_3 \rightarrow YO_3S-(CH_2)_n-R-(CH_2)_m-SO_3Y+2YX$$

Examples of useful dihalogen compounds (2) are α,α'-dichloro-m-xylene, α,α'-dibromo-m-xylene, α,α'-dichloro-p-xylene, α,α'-dibromo-p-xylene, 4,8-di(bromomethyl)tricylco[5.2.1.0$^{2.6}$]decane and 9,10-dibromocamphor.

An electroconductive polymer according to the invention is prepared by polymerizing aniline (or an aniline derivative, or a mixture of aniline and at least one aniline derivative or a mixture of two or more kinds of aniline derivatives) by using an oxidant in the presence of a disulfonic acid of the general formula (1). The polymerization method can be chosen from known methods. For example, the polymerization is performed by adding a solution of the oxidant to a mixed solution of aniline and the disulfonic acid, or by adding aniline to a mixed solution of the disulfonic acid and the oxidant or by introducing aniline vapor into the same mixed solution.

The oxidant for the polymerization reaction can be selected from various kinds of oxidizing agents such as, for example, ammonium disulfate, potassium dichromate, sodium dichromate, ammonium dichromate, hydrogen peroxide, potassium permanganate, sodium permanganate, ammonium permanganate, ferric chloride, ferric sulfonate, cuptic chloride, cuptic sulfonate, lead oxide, potassium perchlorate, sodium perchlorate, ammonium perchlorate, potassium periodide, sodium periodide and ammonium periodide. However, it is preferable to use an oxidant which meets the condition disclosed in our earlier Japanese patent application No. 5-218294, filed Sep. 2, 1993. The condition is that in the oxidation polymerization of aniline a by-product that forms by the reduction of the oxidant should have a dissociation constant (pKa) greater than the dissociation constant (pKa) of the disulfonic acid. In this regard, it is preferable to make a selection from potassium dichromate, sodium dichromate, ammonium dichromate, hydrogen peroxide, potassium permanganate, sodium permanganate, ammonium permanganate, ferric sulfonate, cupric sulfonate and lead oxide.

The solvent for the polymerization reaction is not limited, but it is preferable to use a solvent which is relatively high in polarity. For example, it is suitable to make a selection from water, acetone, ethanol, methanol, tetrahydrofuran, toluene, cresol, acetonitrile, nitrobenzene, chloroform, dichloroethane, halogenated ethers and halogenated esters, including mixtures of these solvents.

In the drawing the single FIGURE illustrates the structure of a solid electrolyte capacitor in which a doped polyaniline is used as the solid electrolyte.

The capacitor has a metal anode 10 and a metal cathode 12 at opposite ends. The metal of the anode 10 is a film-forming metal, i,e. a metal that readily forms an oxide film on the surface, such as tantalum, aluminum, niobium, titanium, zirconium, magnesium or silicon. It is desired that the anode 10 has a very large surface area in a microscopic sense. Therefore, the anode 10 is formed with innumerable micropores by either etching a thin sheet or foil of a film-forming metal or compacting and sintering a powder of a film-forming metal. A dielectric oxide film 14 is formed on the anode surface inclusive of the wall faces in the micropores. Over the dielectric film 14 there is a doped polyaniline layer 16 which is formed so as to intrude deep into the micropores of the anode 10. The cathode 12 is formed over the polyaniline layer 16 usually by applying a silver paste. Optionally, a graphite layer 18 is interposed between the polyaniline layer 16 and the metal cathode 12 for the purpose of strengthening the contact between the polyaniline 16 and the metal electrode 12. Leads 20 and 22 are attached to the anode 10 and the cathode 12, respectively.

The fabrication of a solid electrolyte capacitor using a doped polyaniline according to the invention can be accomplished by using conventional methods and techniques. The dielectric film 14 on the anode 10 is formed by anodic oxidation of the anode body 10 in an electrolyte solution. There is no particular restriction on the selections of the electrolyte, solvent and anodizing conditions. After forming the dielectric film 14, the anode 10 may be subjected to a heat treatment and/or a surface treatment, for the purpose of improving the characteristics of the capacitor. For the oxidation polymerization of anilinie (or an aniline derivative) over the dielectrice film 14, a suitable method is selected from known methods. In one method, first an oxidant or a mixture of the oxidant and a disulfonic acid (usually as a solution) is brought into contact with the anode 10 formed with the dielectrif film 14, and then a mixture of aniline and the disulfonic acid or aniline alone (as a solution or a gas) is fed. In another method, first aniline or a mixture of aniline and a disulfonic acid is brought into contact with the anode formed with the dielectric film, and then a mixture of an oxidant and the disulfonic acid or the oxidant alone is fed. The solid electrolyte 16 formed by the polymerization operation is washed with water or a good solvent for the oxidant in order to remove the residual of the oxidant since the oxidant makes no contribution to the conductivity. The polymerizing and washing operations may be repeated several times according to the need.

The conductivity and reliability of the doped polyaniline as the solid electrolyte 16 in the capacitor depend strongly on the concentration of the dopant (disulfonic acid). The conductivity of the solid electrolyte can be enhanced by increasing the dopant concentration, but if the dopant concentration is too high the capacitor becomes insufficient in humidity resistance and also in heat resistance in packaging operations. If the dopant concentration is too low the solid electrolyte is low in conductivity so that the equivalent series resistance of the capacitor becomes high. Therefore, after forming the doped polyaniline layer 16 the dopant concentration is regulated to a desired level by a suitable method such as redoping by using a disulfonic acid solution of a suitable concentration.

After completing the formation of the polyaniline solid electrolyte 16, a drying operation is made according to the need. Then the cathode 12 is formed by successively applying a carbon paste and a silver paste and making a baking treatment. Finally, the attachment of the lead 22 and encapsulation of the capacitor are performed in a usual way.

EXAMPLE 1

Synthesis of m-xylyrenedisulfonic acid
(m-xylene-α,α'-disulfonic acid)

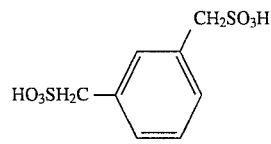

In a 300-ml egg-plant type flask provided with cooling pipe for reflux, 17.5 g (0.1 mol) of m-xylene dichloride was dissolved in 40 ml of toluene, and a solution of 28.0 g (0.22 mol) of sodium sulfite in 40 ml of distilled water was put into the flask. The mixture in the flask was heated in an oil bath kept at 130° C. under refluxing for 24 h, while the mixture was vigorously stirred with a magnetic stirrer using teflon-coated stirring pieces. After that the reaction mixture was cooled to room temperature, and a white precipitate was collected by filtration. The precipitate was dried under reduced pressure and purified by well washing with diethyl ether and then recrystallizing in a 2:1 mixture of water and methanol. The purified product was 16.5 g of sodium m-xylylenedisulfonate (53% yield). The sodium salt was dissolved in distilled water and passed through a column of an ion-exchange resin (Duolite C-20 of Wako Junyaku Co.) to obtain the aimed disulfonic acid.

Analysis of the ultimate product gave the following results.

Melting point (measured in $N_2$ atmosphere at a heating rate of 10° C./min): 138°–142° C.
$^1$H-NMR (solvent was $D_2O$; internal standard was sodium 3-trimethylsilylpropanesulfonate): δ (ppm) 4.16–4.20 (m, 4H), 7.38–7.43 (m, 4H).
IR (KBr tablet): ($cm^{-1}$)
Absorptions characteristic of sulfone around 1240–1220, 1140, 1030, 820 and 705.

|  | Elementary Analysis | | |
| --- | --- | --- | --- |
|  | C | H | S |
| Found (wt %) | 36.3 | 4.0 | 24.1 |
| Calc'd (wt %) | 36.1 | 3.8 | 24.1 |

HPLC (column: ODS 5 μm S; mobile phase: 0.08 wt % aqueous solution of $Na_2HPO_4$; detector: 245 nm UV)

A single peak, proving that the sample was a single compound.

EXAMPLE 2

Synthesis of p-xylylenedisulfonic acid
(p-xylene-α,α'-disulfonic acid)

In the synthesis process of Example 1, 17.5 g (0.1 mol) of p-xylene dichloride was used instead of m-xylene dichloride (0.1 mol) in Example 1. In this case the yield of the aimed compound was 62%. The analytical results were as follows.

Melting point: 139°–143° C.

$^1$H-NMR (solvent was $D_2O$; internal standard was sodium 3-trimethylsilylpropanesulfonate): δ (ppm)
4.18–4.19 (m, 4H), 7.41–7.42 (m, 4H).

IR (KBr tablet): (cm$^{-1}$)

absorptions characteristic of sulfone around 1200, 1140, 1050 and 800.

| | Elementary Analysis | | |
|---|---|---|---|
| | C | H | S |
| Found (wt %) | 36.1 | 4.2 | 24.5 |
| Calc'd (wt %) | 36.1 | 3.8 | 24.1 |

HPLC

A single peak, proving that the sample was a single compound.

EXAMPLE 3

Synthesis of tricyclo[5.2.1.0$^{2.6}$]decane-4,8-di(methylenesulfonic acid)

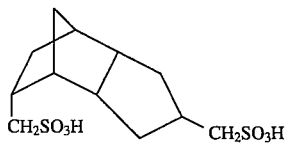

Initially 19.6 g (0.1 mol) of tricyclo[5.2.1.0$^{2.6}$]-decane-4,8-dimethanol (B4, 590-9 of Aldrich Chemical Co., Inc.) and 200 ml of dehydrated tetrahydrofuran were charged into a three-neck flask provided with calcium chloride desiccating tube, thermometer and isobaric dropping funnel. The flask was cooled to −24° C., and 29.8 g (0.11 mol) of phosphorus tribromide was slowly dropped into the flask, while the mixture in the flask was vigorously stirred and the temperature of the mixture was kept below −15° C. The stirring was continued for 5 h. After that the flask was immersed in ice bath, and 30 ml of iced water was slowly dropped into the flask. After well stirring, the flask was left standing at room temperature. Then the solvent in the flask was distilled out under reduced pressure, and the residue was dissolved in 500 ml of chloroform and well washed with water. Then the organic layer was recovered and dehydrated with calcium chloride. After that the solvent was distilled out under reduced pressure, and the residue was purified by silica gel column chromatography (solvent: 1:1 (by volume) mixture of tetrahydrofuran and toluene)) to obtain 14.5 g of 4,8-di(bromomethyl)tricyclo[5.2.1.0$^{2.6}$]decane (60% yield).

Next, the process of Example 1 was repeated except that 12.1 g (0.05 mol) of 4,8-di(bromomethyl)tricyclo[5.2.1.0$^{2.6}$]decane was used instead of m-xylene dichloride (0.1 mol) in Example 1. As the result, 7.2 g of tricyclo[5.2.1.0$^{2.6}$]decane-4,8-di(methylenesulfonic acid) was obtained (45% yield).

$^1$H-NMR (solvent was $D_2O$; internal standard was sodium 3-trimethylsilylpropanesulfonate): δ (ppm)
1.0–2.5 (m, 14H), 3.4–3.6 (m, 4H, —$CH_2SO_3H$).

IR (KBr tablet): (cm$^{-1}$)

absorptions characteristic of sulfone around 1210, 1140, 1000 and 840.

| | Elementary Analysis | | |
|---|---|---|---|
| | C | H | S |
| Found (wt %) | 44.2 | 6.4 | 19.6 |
| Calc'd (wt %) *) | 44.4 | 6.2 | 19.7 |

*) for $C_{12}H_{20}O_6S_2$ (MW: 324.41)

HPLC

A single peak, proving that the sample was a single compound.

The following Examples 4 to 9 illustrate the preparation of doped polyanilines using the disulfonic acids of Examples 1 to 3.

EXAMPLE 4

In a 300-ml egg-plant type flask provided with a dropping funnel. 1.4 g (5 mmol) of p-xylylenedisulfonic acid (Example 2) was dissolved in 100 ml of distilled water. Stirring the solution, 0.93 g (10 mmol) of aniline was dissolved in the solution. Separately, a solution was prepared by dissolving 0.94 g (3.3 mmol) of ammonium dichromate and 3.2 g (12 mmol) of p-xylylenedisulfonio acid in 30 ml of distilled water, and this solution was slowly dropped into the initial solution to spend 2 h to complete the addition, while the temperature of the mixed solution was kept below 0° C. After that stirring was continued for 3 h to accomplish polymerization.

A solid product of the above polymerization process was collected by filtration, washed with 1 liter of distilled water and then with 0.5 liter of ethanol and thereafter dried under reduced pressure. As a result 1.7 g of doped polyaniline was obtained.

EXAMPLE 5

The whole process of Example 4 was repeated except that a 1:1 mixture of distilled water and ethanol was used as the solvent for the polymerization reaction. As a result 1.6 g of doped polyaniline was obtained.

EXAMPLE 6

The process of Example 4 was modified only in that 1.2 g (10 mmol) of hydrogen peroxide was used instead of ammonium dichromate (3.3 mmol) in Example 4. As a result 1.7 g of doped polyaniline was obtained.

EXAMPLE 7

The process of Example 4 was modified only in that 1.23 g (10 mmol) of o-methoxyaniline was used instead of aniline (10 mmol) in Example 4 and that 1.2 g of hydrogen peroxide was used instead of ammonium dichromate (3.3 mmol) in Example 4. As a result, 1.9 g of doped poly(o-methoxyanilinile) was obtained.

EXAMPLE 8

In place of p-xylylenedisulfonic acid used in Example 4, the same quantity of m-xylylenedisulfonic acid (Example 1) was used. Except for this change, the process of Example 4 was repeated. As a result 1.7 g of doped polyaniline was obtained.

EXAMPLE 9

In place of p-xylylenedisulfonic acid (5 mmol) initially dissolved in the process of Example 4, 1.6 g (5 mmol) of the disulfonic acid of Example 3 was used. Except for this change, the process of Example 4 was repeated. As a result 1.8 g of doped polyaniline was obtained.

The following three Comparative Examples relate to the preparation of polyanilines doped with known sulfonic acids.

COMPARATIVE EXAMPLE 1

In a 300-ml egg-plant type flask provided with a dropping funnel, 1.0 g (10 mmol) of methanesulfonic acid was dissolved in 100 ml of distilled water. Stirring the solution, 0.93 g (10 mmol) of aniline was dissolved in the solution. Separately, a solution was prepared by dissolving 0.94 g (3.3 mmol) of ammonium dichromate and 2.4 g (24 mmol) of methanesulfonic acid in 30 ml of distilled water, and this solution was slowly dropped into the initial solution to spend 2 h to complete the addition, while the temperature of the mixed solution was kept below 0° C. After that stirring was continued for 3 h to accomplish polymerization.

A solid product of the above polymerization process was collected by filtration, washed with 1 liter of distilled water and then with 0.5 liter of ethanol and thereafter dried under reduced pressure. As a result 1.4 g of doped polyaniline was obtained.

COMPARATIVE EXAMPLE 2

In the process of Comparative Example 1, toluenesulfonic acid was used instead of methanesulfonic acid. That is, initially 1.7 g (10 mmol) of toluenesulfonic acid and 10 mmol of aniline were dissolved in 100 ml of water, and another solution of 4.2 g (24 mmol) of toluenesulfonic acid and 3.3 mmol of ammonium dichromate in 30 ml of water was dropped into the initial solution. As a result 1.7 g of doped polyaniline was obtained.

COMPARATIVE EXAMPLE 3

In the process of Comparative Example 1, butanedisulfonic acid was used instead of methanesulfonic acid. That is, initially 1.1 g (5 mmol) of butanedisulfonic acid and 10 mmol of aniline were dissolved in 100 ml of water, and another solution of 2.6 g (12 mmol) of butanedisulfonic acid and 3.3 mmol of ammonium dichromate in 30 ml of water was dropped into the initial solution. As a result 1.5 g of doped polyaniline was obtained.

The doped polyanilines prepared in Examples 4–9 and Comparative Examples 1–3 were subjected to the measurement of electrical conductivity and thermogravimetric analysis.

For measurement of conductivity, each polyaniline was shaped into a pellet by applying a compressive pressure of 4500 kg/cm$^2$ by using a tabletting machine for IR spectroscopy, and specimens in the form of strip 1 mm in width and 10 mm in length were cut out of the pellet. The measurement was made by the four-terminal method at room temperature under reduced pressure.

The thermogravimetric analysis was performed in nitrogen gas atmosphere by raising the temperature at a constant rate of 10° C./min within the temperature range of from 25° to 700° C.

The results are shown in Table 1, wherein $T_c$ is a critical temperature, viz. decomposition point, at which thermal decomposition of the sample began.

TABLE 1

| Polyaniline | Conductivity (S/cm) | $T_c$ (°C.) |
| --- | --- | --- |
| Ex. 4 | 6.3 | 295 |
| Ex. 5 | 2.3 | 287 |
| Ex. 6 | 4.5 | 288 |
| Ex. 7 | 0.6 | 301 |
| Ex. 8 | 5.1 | 291 |
| Ex. 9 | 3.0 | 280 |
| Comp. Ex. 1 | 1.3 | 205 |
| Comp. Ex. 2 | 3.8 | 238 |
| Comp. Ex. 3 | 4.2 | 278 |

The following Examples 10 to 14 relate to solid electrolyte capacitors using doped polyanilines according to the invention.

EXAMPLE 10

A cylindrical anode body 1.5 mm in diameter and 2 mm in height was prepared by compacting and sintering a fine powder of tantalum. The anode body had a CV value (product of capacitance by anodizing voltage) of 30000 per gram. The anode body was anodized in 0.05 wt % aqueous solution of nitric acid at a voltage of 60 V, followed by washing and drying.

At room temperature the anodized tantalum pellet was immersed for 30 sec in a solution of aniline and p-xylylenedisulfonic acid (Example 2) in a 1:1 mixture of water and ethanol. In the solution the concentration of aniline was 5 wt %, and the molar ratio of the disulfonic acid to aniline was 1:1. The wet pellet was left in the atmosphere for 5 min. After that the pellet was immersed for 30 sec in an aqueous solution of ammonium dichromate and p-xylylenedisulfonic acid cooled to 0° C. In this solution the concentration of dichromic acid was 10 wt %, and the molar ratio of the dichromate to the disulfonic acid was 1:1.5. After that the pellet was left in the atmosphere for 10 min to allow the polymerization of aniline to procced, and thereafter the pellet was washed with water and ethanol and dried under reduced pressure. As a result a doped polyniline in black color was formed over the dielectric oxide film on the tantalum anode body.

The above described aniline polymerization process was repeated 5 times in total. After that the polyaniline on the anode body was immersed in 0.1M solution of p-xylylenedisulfonic acid for 10 min, followed by washing with ethanol and drying. Then a cathode was formed on the polyaniline layer by successively applying a graphite paste and a silver paste and making a baking treatment. Finally a lead was attached to the cathode, and a capacitor was completed by encapsulation with an epoxy resin.

EXAMPLE 11

The entire process of Example 10 was repeated except that hydrogen peroxide was used as the oxidant in place of ammonium dichromate in Example 10. In the aqueous solution of the oxidant and the disulfonic acid, the concentration of hydrogen peroxide was 10 wt %.

EXAMPLE 12

Example 10 was modified only in that p-xylylenedisulfonic acid was replaced by m-xylylenedisulfonic acid (Example 1).

EXAMPLE 13

Example 10 was modified only in that p-xylylenedisulfonic acid was replaced by tricyclo[5.2.1.0$^{2.6}$]-decane-4,8-di(methylenesulfonic acid) (Example 3).

EXAMPLE 14

As the anode body, a rectangular piece (10 mm×5 mm) of a 150 μm thick aluminum foil was used. The aluminum focal was etched to make the surface area about 20 times larger. The aluminum foil piece was anodized in 5% aqueous solution of ammonium borate at a voltage of 100 V. Except for these changes in respect of the anode, the entire process of Example 10 was repeated.

For comparison, three different kinds of solid electrolyte capacitors not in accordance with the invention were produced.

COMPARATIVE EXAMPLE 4

Methanesulfonic acid was used in place of p-xylylenedisulfonic acid in Example 10, and the process of Example 10 was repeated except that in the aqueous solution of the oxidizer and the sulfonic acid the molar ratio of ammonium dichromate to methanesulfonic acid was varied to 1:3.

COMPARATIVE EXAMPLE 5

Comparative Example 4 was modified only in that toluenesulfonic acid was used instead of methanesulfonic acid.

COMPARATIVE EXAMPLE 6

Example 10 was modified only in that butanedisulfonic acid was used in place of p-xylylenedisulfonic acid.

The characteristics of the solid electrolyte capacitors of Examples 10–14 and Comparative Examples 4–6 were represented by equivalent series resistance (ESR) at 30 kHz and capacitance ratio, $C/C_O \times 100$ (%), where C is the measured capacitance and $C_O$ is the maximum capacitance in an electrolyte solution. The resistance and capacitance were measured immediately after the fabrication. Then a first group of samples of the capacitors were subjected to a heating test at 260° C. for 10 sec as a simulation of soldering. A second group of the capacitor samples were subjected to a high-temperature endurance test at 125° C. for 200 h, and a third group to a high-humidity endurance test at 80° C. and 95% RH for 200 h. After the heating or endurance test the resistance and capacitance of every capacitor were measured again. The results are shown in Tables 2 and 3. It is seen that the capacitors using the doped polyanilines of the invention are all good in resistance to the soldering temperature and stability at high-temperature and high-humidity conditions.

TABLE 2

| Capacitor | | $C/C_0$ (%) | ESR (Ω) |
|---|---|---|---|
| Ex. 10 | as produced | 93 | 0.23 |
| | after heating at 260° C. | 91 | 0.25 |
| Ex. 11 | as produced | 88 | 0.31 |
| | after heating at 260° C. | 90 | 0.27 |
| Ex. 12 | as produced | 83 | 0.33 |
| | after heating at 260° C. | 81 | 0.35 |
| Ex. 13 | as produced | 92 | 0.25 |
| | after heating at 260° C. | 90 | 0.29 |
| Ex. 14 | as produced | 97 | 0.18 |
| | after heating at 260° C. | 95 | 0.22 |
| Comp. Ex. 4 | as produced | 88 | 0.22 |
| | after heating at 260° C. | 65 | 2.6 |
| Comp. Ex. 5 | as produced | 90 | 0.25 |
| | after heating at 260° C. | 88 | 0.47 |
| Comp. Ex. 6 | as produced | 83 | 0.28 |
| | after heating at 260° C. | 82 | 0.48 |

TABLE 3

| Capacitor | | $C/C_0$ (%) | ESR (Ω) |
|---|---|---|---|
| Ex. 10 | as produced | 93 | 0.23 |
| | after keeping at 125° C. | 91 | 0.19 |
| | after keeping at 80° C., 95% RH | 95 | 0.22 |
| Ex. 11 | as produced | 88 | 0.31 |
| | after keeping at 125° C. | 83 | 0.35 |
| | after keeping at 80° C., 95% RH | 90 | 0.37 |
| Ex. 12 | as produced | 83 | 0.33 |
| | after keeping at 125° C. | 80 | 0.35 |
| | after keeping at 80° C., 95% RH | 86 | 0.31 |
| Ex.13 | as produced | 92 | 0.25 |
| | after keeping at 125° C. | 91 | 0.27 |
| | after keeping at 80° C., 95% RH | 91 | 0.29 |
| Ex.14 | as produced | 97 | 0.18 |
| | after keeping at 125° C. | 91 | 0.20 |
| | after keeping at 80° C., 95% RH | 96 | 0.20 |
| Comp. Ex. 4 | as produced | 88 | 0.22 |
| | after keeping at 125° C. | 72 | 1.8 |
| | after keeping at 80° C., 95% RH | 42 | 10.3 |
| Comp. Ex. 5 | as produced | 90 | 0.25 |
| | after keeping at 125° C. | 88 | 0.28 |
| | after keeping at 80° C., 95% RH | 91 | 0.31 |
| Comp. Ex. 6 | as produced | 83 | 0.28 |
| | after keeping at 125° C. | 81 | 0.26 |
| | after keeping at 80° C., 95% RH | 85 | 0.25 |

What is claimed is:

1. A solid electrolyte capacitor having an anode, a dielectric oxide film formed on the surface of the anode, a solid electrolyte layer which overlies the dielectric oxide film and a cathode in contact with the solid electrolyte layer, wherein the solid electrolyte layer is formed of an electroconductive polymer comprising a polymer of aniline or at least one aniline derivative and, as a dopant, a protonic acid, characterized in that said protonic acid is a disulfonic acid represented by the general formula (1):

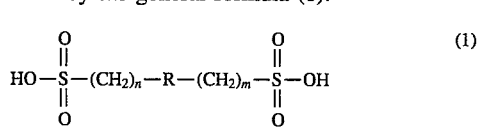

$$HO-\underset{\underset{O}{\|}}{\overset{\overset{O}{\|}}{S}}-(CH_2)_n-R-(CH_2)_m-\underset{\underset{O}{\|}}{\overset{\overset{O}{\|}}{S}}-OH \quad (1)$$

where R is m-phenylene, p-phenylene or a $C_7$ to $C_{10}$ bridged cycloalkylene group, and n and m are independently integers from 1 to 3.

2. A solid electrolyte capacitor according to claim 1, wherein in said electroconductive polymer the proportion of said dopant to the aniline or aniline derivative units is not less than 15% by mol.

3. A solid electrolyte capacitor according to claim 2, wherein said proportion is in the range from 15 to 40% by mol.

4. A solid electrolyte capacitor according to claim 1, wherein said bridged cycloalkylene group is tricyclo [5.2.1.0$^{2.6}$]decane-4,8-diyl group.

5. A solid electrolyte capacitor according to claim 1, wherein said at least one aniline derivative is selected from the group consisting of alkylanilines and alkoxyanilines.

6. An electroconductive polymer suitable for use as a solid electrolyte in a solid electrolyte capacitor, comprising polyaniline and, as a dopant, a disulfonic acid represented by the general formula (1):

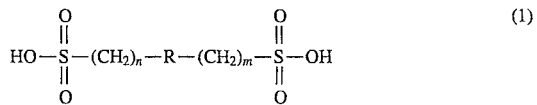

where R is m-phenylene, p-phenylene or a $C_7$ to $C_{10}$ bridged cycloalkylene group, and n and m are independently integers from 1 to 3.

7. An electroconductive polymer according to claim 6, wherein the proportion of said disulfonic acid to the aniline units of the polyaniline is not less than 15% by mol.

8. An electroconductive polymer according to claim 7, wherein said proportion is in the range from 15 to 40% by mol.

9. An electroconductive polymer according to claim 6, wherein said bridged cycloalkylene group is tricyclo [5.2.1.0$^{2.6}$]decane-4,8-diyl group.

10. An electroconductive polymer suitable for use as a solid electrolyte in a solid electrolyte capacitor, comprising a polymer of at least one aniline derivative and, as a dopant, a disulfonic acid represented by the general formula (1):

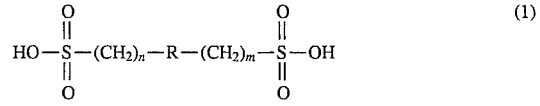

where R is m-phenylene, p-phenylene or a $C_7$ to $C_{10}$ bridged cycloalkylene group, and n and m are independently integers from 1 to 3.

11. An electroconductive polymer according to claim 10, wherein the proportion of said disulfonic acid to the aniline derivative units of the polymer is not less than 15% by mol.

12. An electroconductive polymer according to claim 11, wherein said proportion is in the range from 15 to 40% by mol.

13. An electroconductive polymer according to claim 10, wherein said bridged cycloalkylene group is tricyclo [5.2.1.0$^{2.6}$]decane-4,8-diyl group.

14. An electroconductive polymer according to claim 10, wherein said at least one aniline derivative is selected from the group consisting of alkylanilines and alkoxyanilines.

15. A disulfonic acid represented by the general formula (1):

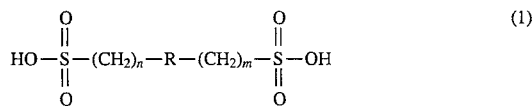

where R is m-phenylene, p-phenylene or a $C_7$ to $C_{10}$ bridged cycloalkylene group, and n and m are independently integers from 1 to 3.

16. A disulfonic acid according to claim 15, wherein said bridged cycloalkylene group is tricyclo[5.2.1.0$^{2.6}$]decane-4, 8-diyl group.

* * * * *